United States Patent [19]
Jackson

[11] 4,183,267
[45] Jan. 15, 1980

[54] NESTED BEARING CRANK MECHANISM

[75] Inventor: George J. Jackson, Peoria, Ill.

[73] Assignee: Caterpillar Tractor Co., Peoria, Ill.

[21] Appl. No.: 922,945

[22] Filed: Jul. 10, 1978

[51] Int. Cl.² .............................................. F16H 1/28
[52] U.S. Cl. ...................................... 74/804; 91/490;
 91/492; 308/183
[58] Field of Search .................... 74/804; 91/490, 492;
 308/183, 184 R

[56] References Cited

U.S. PATENT DOCUMENTS

| | | | |
|---|---|---|---|
| 3,597,029 | 8/1971 | Marcum | 308/183 |
| 3,762,488 | 10/1973 | Dammon | 91/492 X |
| 3,986,753 | 10/1976 | Lindner | 308/184 R |
| 4,074,615 | 2/1978 | Avery | 91/490 |

*Primary Examiner*—James C. Mitchell
*Attorney, Agent, or Firm*—William B. Heming

[57] ABSTRACT

A rotating assembly (22) is used, for example, as a crank assembly in an orbiting radial motor (14) to drive ring gears (16,17) or in a multiple output speed increaser or reducer. The use of more than one rotatable section connected to a first member (30), such as more than one throw on a crankshaft, can cause unequal load sharing between the sections. The rotating assembly (22) has a first member (30), a second annular member (32) positioned about the first member (30) and a third annular member (34) positioned about the second annular member (32). A first bearing element (48) positioned between the first and second members (30,32) supports the second member (32) in rotation relative to the first member. A second bearing element (56) positioned between the second and third members (32,34) supports the third member (34) in rotation relative to the second member (32). In the assembly (22), each respective bearing element (48,56) is in continuous contact with and about the entire relative surface peripheries of the respective relative members (30,32) (32,34).

7 Claims, 6 Drawing Figures

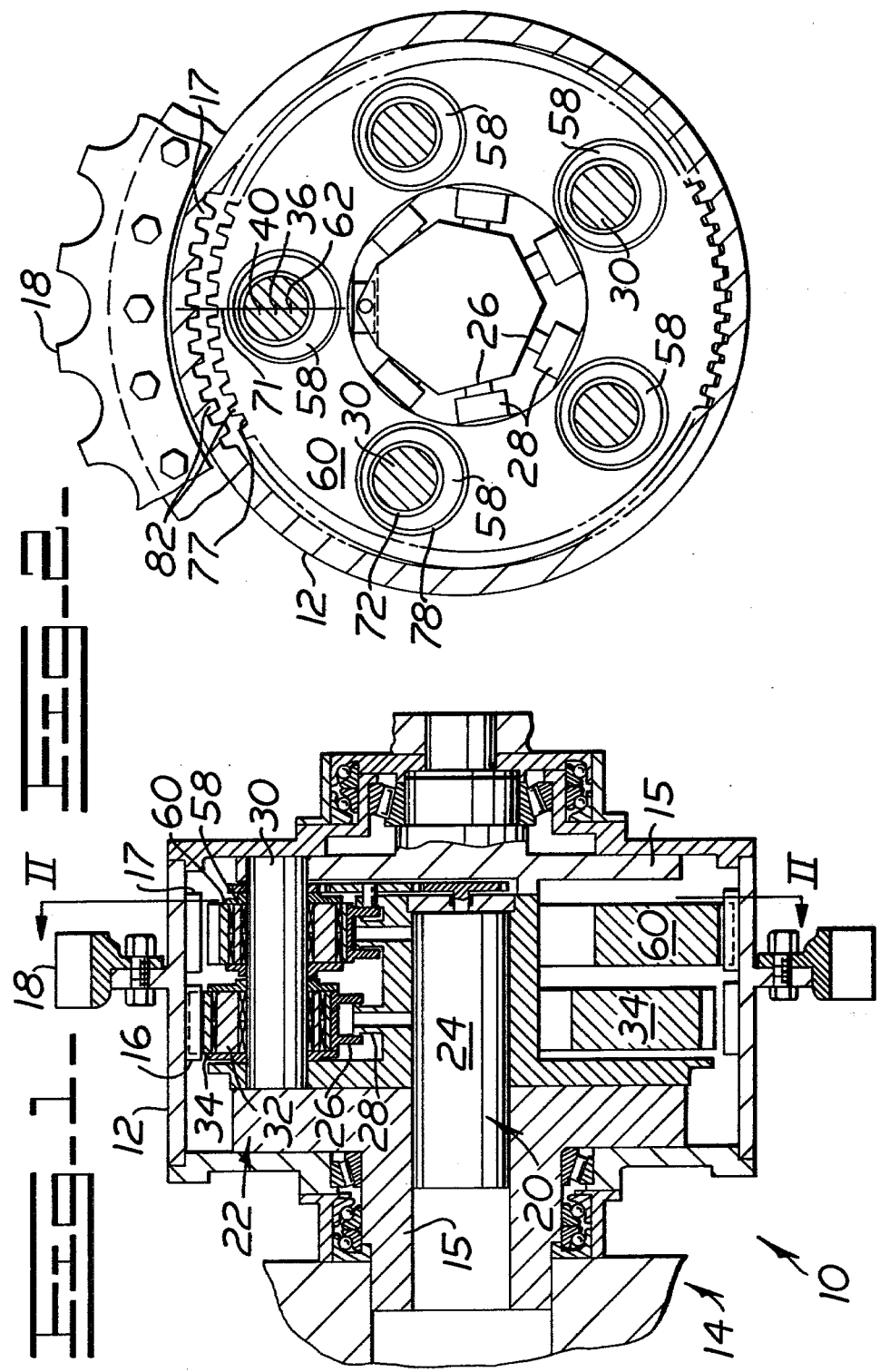

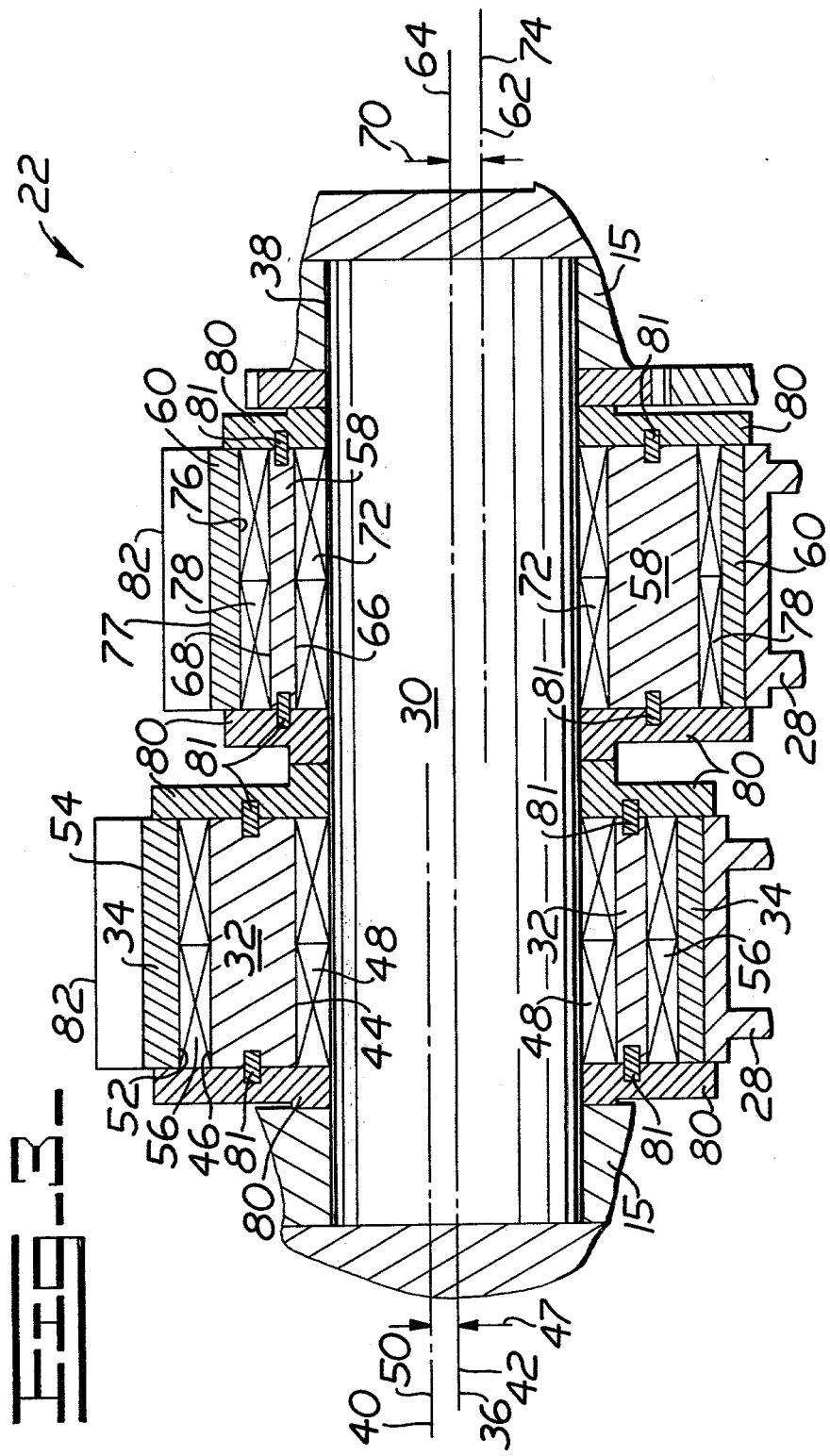

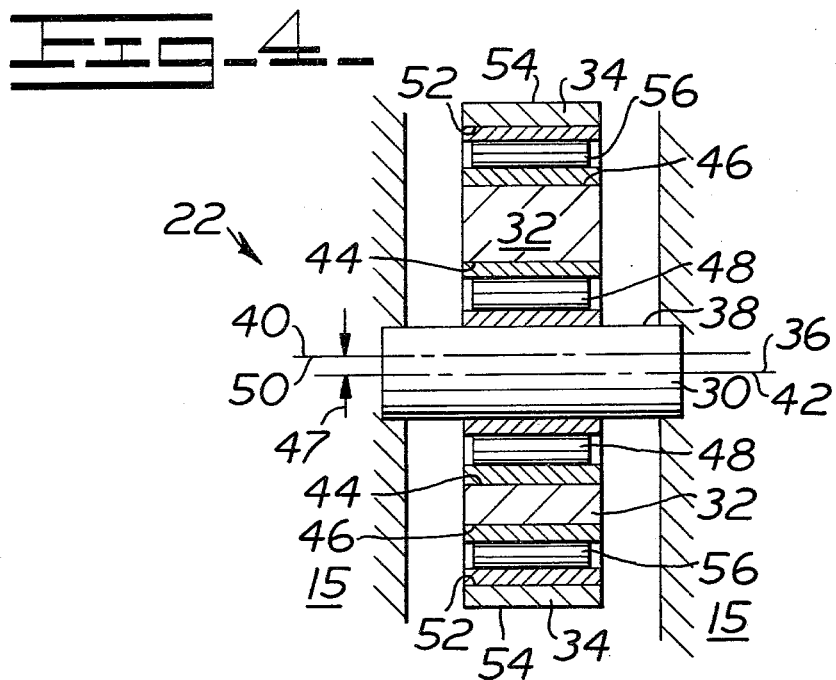
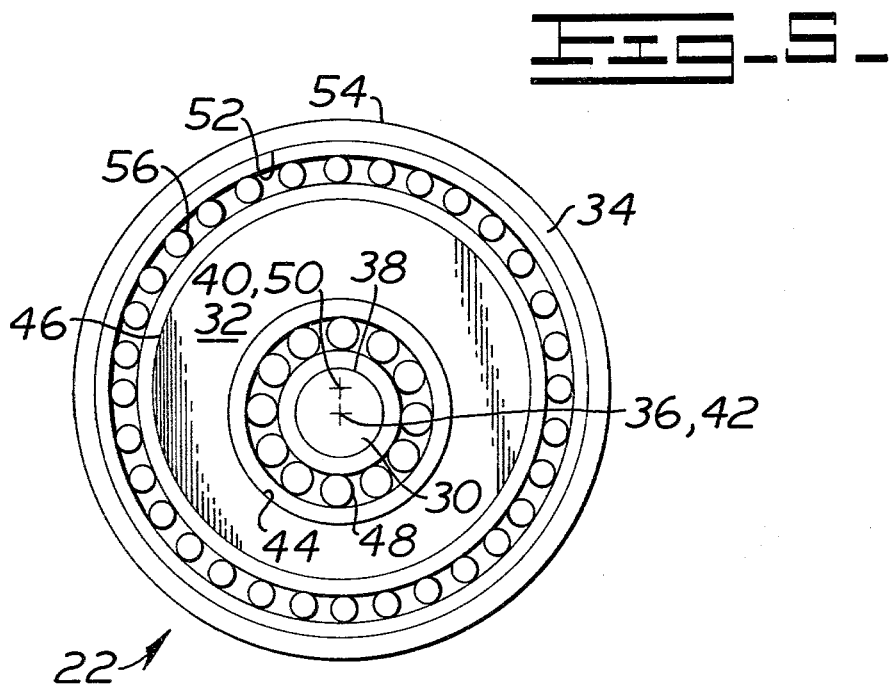

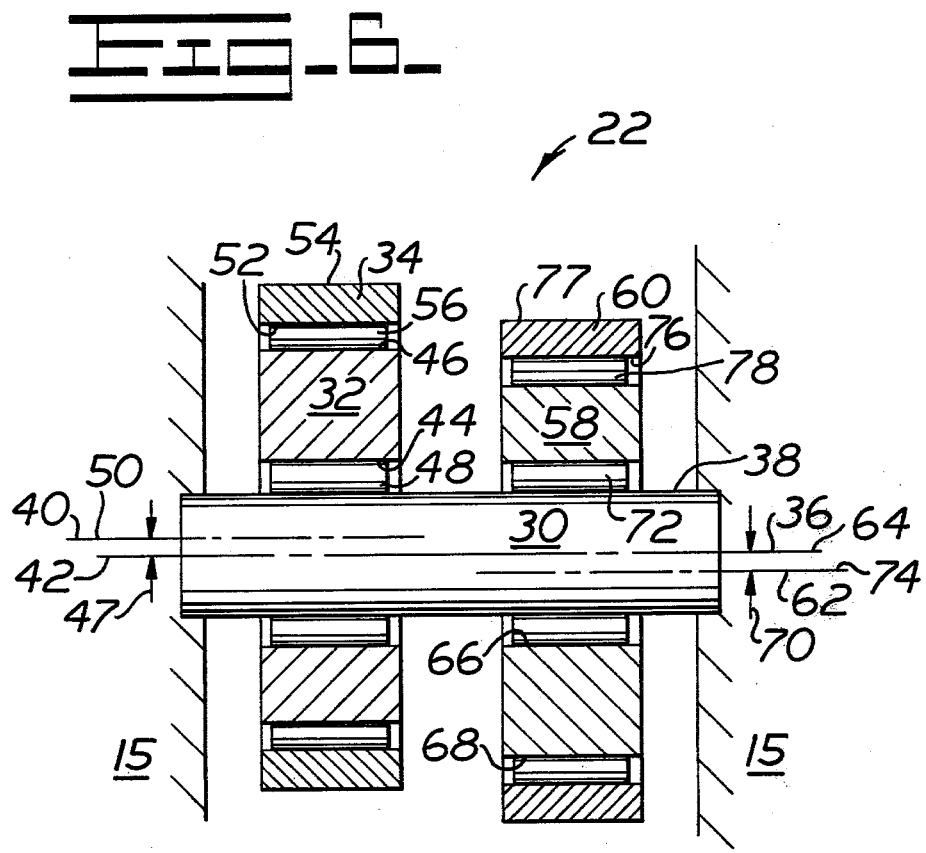

NESTED BEARING CRANK MECHANISM

TECHNICAL FIELD

The invention relates to a rotating assembly having first and second bearing elements positioned between a first member and second annular member and between the second annular member and a third annular member, respectively, as is used, for example, in an orbiting radial motor, multiple output speed reducer or increaser or an internal combustion engine. More particularly, the invention relates to nested or concentric bearing elements each in continous contact with and about an entire surface periphery of the respective members between which each bearing is positioned.

BACKGROUND ART

In the use of a rotating assembly, it is desirable to provide adjacent, independent drive sections supported in rotatable relationship about a common first member for maintaining equal load sharing characteristics between the drive sections. The rotating assembly has a first member, a second annular member positioned about the first member and a third annular member positioned about the second annular member. The invention relates to nested or concentric first and second bearing elements supporting the second and third annular members in rotatable relationship about the first member and the second annular member, respectively.

U.S. Pat. No. 3,986,753, Oct. 19, 1976, issued to Lindner, discloses an annular member of eccentric configuration positioned between and in only partial contact with concentric bearing elements. U.S. Pat. No. 3,597,029, Aug. 3, 1971, issued to Marcum, discloses concentric bearing elements positioned about a central shaft.

In an orbiting radial motor, the rotating assembly, for example, is a crankshaft assembly having an orbiting or rotating member driven by hydraulically actuated slipper pistons. As discribed in U.S. Pat. No. 4,074,615 issued to Avery on Feb. 21, 1978, orbiting members are each rotatably positioned about respective eccentric throws of a crankshaft. Forces exerted by the slipper pistons on respective orbiting members cause said members to orbit in a pathway determined by the eccentric throws restraining said orbiting members. The eccentric throws provide orbiting motion of the member in combination with the forces exerted by the slipper pistons for rotating the ring gear and driving the sprocket of a vehicle.

The use of more than one orbiting section or throw connected to a single crankshaft can cause unequal load sharing between the two orbiting sections. The result is increased wear or breakage of components and a waste of time and labor to carefully machine associated components for providing close tolerances, particularly to overcome unequal load sharing characteristics. The use of more than one crankshaft to support independent throws for overcoming unequal load carrying characteristics can cause interference in space limited situations.

Therefore, it is desirable to provide independent orbiting sections about a single first member in order to overcome unequal load sharing characteristics between the orbiting sections and to reduce the length of the rotating assembly.

DISCLOSURE OF INVENTION

In one aspect of the invention, a rotating assembly has a first member and a second annular member positioned about the first member. The first member has an outer surface. The second member has inner and outer surfaces. A first bearing element is positioned between said first and second members. A third annular member is positioned about the second annular member. Said third member has an inner surface. A second bearing element is positioned between said second and third members. The assembly has the first bearing element in continuous contact with and about the entire periphery of the first member outer surface and the second annular member inner surface. The second bearing element is in continuous contact with and about the entire periphery of the second annular member outer surface and the third annular member inner surface.

In the use of the rotating assembly, such as a crankshaft mechanism, it is desirable to provide independent orbiting sections about a common first member for overcoming unequal load sharing between the two sections in driving a common output.

The heretofore encountered problems are solved by nested or concentric bearing elements in continuous contact with and about the surface peripheries of respective associated members of the rotating assembly. The first bearing element supports the second annular member in rotatable relationship about the first member. The second bearing element supports the third annular member in rotatable relationship about the second annular member. The result is independent rotation of the second and third annular members relative to the first member. In a similar manner, additional annular members can provide separate sections positioned about and rotating independently of the common first member for substantially overcoming the unequal loading possible between, for example, throws of a crankshaft used to drive the common output.

BRIEF DESCRIPTION OF DRAWINGS

FIG. 1 is a diagrammatic view showing an embodiment of the invention on a dual orbiting radial motor;

FIG. 2 is a diagrammatic cross-sectional view taken along line II—II of FIG. 1 showing the embodiment of FIG. 1 in greater detail;

FIG. 3 is a diagrammatic partial view of FIG. 1 showing the embodiment of FIG. 1 in still greater detail;

FIG. 4 is a diagrammatic cross-sectional view showing another embodiment of the invention;

FIG. 5 is a diagrammatic view showing still another embodiment of the invention; and FIG. 6 is a diagrammatic cross-sectional view showing yet another embodiment of the invention.

BEST MODE FOR CARRYING OUT THE INVENTION

Referring to FIGS. 1, 2 and 3, a dual orbiting radial drive 10 has a sprocket drum 12, a dual orbiting radial motor 14 and a frame or hub 15. The sprocket drum 12 has first and second ring gears 16, 17 and teeth 18. The dual orbiting radial motor 14 has a radial motor 20 and rotating assembly 22. The radial motor 20 has a rotary valve 24, slipper pistons 26 and cylinders 28. A dual orbiting radial drive is disclosed, for example, in U.S. Pat. No. 4,074,615, Feb. 21, 1978, issued to Avery.

Referring to the drawings, a rotating assembly 22 has a first member 30 and second and third annular members 32, 34. The first member 30 has an axis 36 and an outer surface 38. Said first member 30 is preferably a shaft 30 fixably connected to the frame 15. The first member 30 can also be connected to the frame 15 with biasing means or a bearing element.

The second annular member 32 has a first central axis 40, a first axis of rotation 42, and inner and outer surfaces 44, 46. Said second annular member 32 is positioned about the first member 30. The central axis 40 is spaced a first preselected distance 47 from the first axis of rotation 42. In other words, the second annular member 32 is of eccentric configuration relative to the first axis of rotation 42. Said first axis of rotation 42 is substantially the same as the axis 36 of the first member 30.

A first bearing element 48 is positioned between the first member 30 and the second annular member 32. Said first bearing element 48 is in continuous contact with and about the entire periphery of the outer surface 38 of the first member 30 and the inner surface 44 of the second annular member 32. The first bearing element 48 supports the second annular member 32 in rotatable relationship relative to the first member 30.

The third annular member 34 has a second central axis 50 and inner and outer surfaces 52, 54. Said third annular member 34 is positioned about the second annular member 32. In the embodiments of FIGS. 4, 5 and 6, said second central axis 50 is substantially the same as the first central axis 40 of the second annular member 32. A second bearing element 56 is positioned between said second and third annular members 32, 34. Said second bearing element 56 is in continuous contact with and about the entire outer periphery of the outer surface 46 of the second annular member 32 and the inner surface 52 of the third annular member 34. The second bearing element 56 supports said third annular member 34 in rotatable relationship relative to the second annular member 32.

The rotating assembly 22 of the dual orbiting drive 10 and of FIG. 6 includes fourth and fifth annular members 58, 60. The fourth annular member 58 is also positioned about the first member 30. In other embodiments, it can be desirable to connect said second and fourth annular members 32, 58 one to the other.

As is shown in FIGS. 1 and 2, a preselected number of second and fourth annular members 32, 58 are positioned about the same number of first members 30. The third and fifth annular members 34, 60 are each positioned about the respective second and fourth annular members 32, 58.

Said fourth annular member 58 has a third central axis 62, a second axis of rotation 64, and inner and outer surfaces 66, 68. Said second axis of rotation 64 is substantially the same as the axis 36 of the first member 30. The third central axis 62 is spaced a second preselected distance 70 from the second axis of rotation 64. Preferably, said second preselected distance 70 is substantially the same as the first preselected distance 47.

The first central axis 40 of the second annular member 32 and the first member axis 36 define a plane 71 (FIG. 2). The third central axis 62 of the fourth annular member 58 is preferably positioned substantially opposite the first member axis 36 relative to the first central axis 40 of the second annular member 32. In other words, the element of eccentricity of the second annular member 32 is spaced about 180 degrees from the element of eccentricity of the fourth annular member 58.

A third bearing element 72 is positioned between the first member 30 and the fourth annular member 58. Said bearing element 72 is in continuous contact about the entire periphery of the outer surface 38 of the first member 30 and the inner surface 66 of the fourth annular member 58. The third bearing element 72 supports said fourth annular member 58 in rotatable relationship relative to the first member 30.

The fifth annular member 60 has a fourth central axis 74 and inner and outer surfaces 76, 77. Said member 60 is positioned about the fourth annular member 58. In the embodiment of FIG. 6, the fourth central axis 74 is substantially the same as the third central axis 62 of the fourth annular member 58. A fourth bearing element 78 is positioned between the fourth and fifth annular members 58, 60. Said fourth bearing element 78 is in continuous contact about the entire periphery of the outer surface 68 of the fourth annular member 58 and the inner surface 76 of the fifth annular member 60. The fourth bearing element 78 supports the fifth annular member 60 in rotatable relationship relative to the fourth annular member 58.

It is desirable that the bearing elements 48, 56, 72, 78 be of the roller type. Additionally, the race portions of the bearing elements 48, 56, 72, 78 can be formed in the related surfaces of the first member 30 and second, third, fourth and fifth annular members 32, 34, 58, 60, as is shown in FIG. 6. The bearing elements 48, 56, 72, 78 of the dual orbiting radial motor 14 preferably each have two separate roller bearings positioned one laterally adjacent the other, as shown in FIGS. 1 and 3. It should be understood that said bearing elements 48, 56, 72,, 78 can be of other configurations as is known in the art without departing from the invention.

Industrial Applicability

In the operation of the rotating assembly 22, forces are exerted on one of the second and third annular members 32, 34 for providing rotational input to the assembly 22. In exerting input forces on the second annular member 32, the third annular member 34 moves in an orbit, owing to the manner to which the second annular member 32 restrains said third annular member 34, and exerts output forces. In exerting input forces on the third annular member 34, the second annular member 32 rotates and the third annular member 34 moves in an orbit. One of said second and third annular members 32, 34 is used to exert output forces.

In the example shown, the dual orbiting radial motor 14 rotates the sprocket drum 12 and teeth 18 to drive the track of a track-type vehicle (not shown). The rotary valve 24 and associated components (not shown) hydraulically move the slipper pistons 26 for exerting input forces against the third and fifth annular members 34, 60. The second and fourth annular members 32, 58 rotate relative to the third and fifth annular members 34, 60, respectively. As is best seen in FIG. 3, thrust bearing retainers 80 connected by dowels 81 to the second and fourth annular members 32, 58 maintain alignment of the third and fifth annular members 34,60 relative to respective second and fifth annular members 32,58. Said retainers 80 also maintain said annular members 32,34,58,60 in preselected axial positions relative to the first member 30.

The third and fifth annular members 34,60 each move in an orbit about the first member 30. Said members 34,60 do not rotate about an axis. The orbit of the third and fifth annular members 34,60 is determined by the eccentric configuration of the second and fifth annular members 32,58 restraining said members 34,60, respectively. In the embodiments shown, the orbit of any point on the third and fifth annular members 34,60 describes a circle. The first and second preselected distance 47,70 determine the magnitude of the orbital pathway. In this manner, teeth 82 positioned on the respective outer surfaces 54,77 of said annular members 34,60 also move in a generally circular orbit to engage respective ring gears 16,17 for rotating the sprocket drum 12 and driving the track of the associated vehicle (not shown).

The dual orbiting radial motor 14 drives the sprocket drum 12 at substantially opposite locations on said drum 12 owing to the opposed position of the eccentric portion of the second annular member 32 relative to the corresponding portion on the fifth annular member 58.

Therefore, in the dual orbiting radial motor 14, the third and fifth annular members 34,60 are independently positioned relative to a common first member 30. This eliminates the need for separate first members 30 for respective third and fifth annular members 34,60. The independent radial motion of the third and fifth annular members 34,60 overcomes unequal load sharing between said members 34,60 in driving the sprocket drum 12. Additionally, the nested or concentric configuration of the bearing elements 48,56,72,78 reduces the length of the rotating assembly 22.

What is claimed is:

1. In a rotating assembly (22) having a first member (30) having an axis (36) and an outer surface (38), a second annular member (32) having a first central axis (40), a first axis of rotation (42) and inner and outer surfaces (44,46) and being positioned about said first member (30), said first axis of rotation (42) being substantially the same as the first member axis (36), said first central axis (40) being spaced a first preselected distance (47) from said first axis of rotation (42), a first bearing element (48) positioned between said first member (30) and said second annular member (32), a third annular member (34) having a second central axis (50) and an inner surface (52) and being positioned about said second annular member (32) and a second bearing element (56) positioned between said second and third annular members (32,34), the improvement comprising:

said first bearing element (48) being in continuous contact with and about the entire periphery of the outer surface (38) of the first member (30) and the inner surface (44) of the second annular member (32), said first bearing element (48) supporting said second annular member (32) in rotatable relationship relative to said first member (30); and said second bearing element (56) being in continuous contact with and about the entire periphery of the outer surface (46) of the second annular member (32) and the inner surface (52) of the third annular member (34), said second bearing element (56) supporting said third annular member (34) in rotatable relationship relative to said second annular member (32).

2. The improvement, as set forth in claim 1, wherein said second central axis (50) is substantially the same as the first central axis (40) of the second annular member (32).

3. The improvement, as set forth in claim 1, wherein the assembly (22) includes a fourth annular member (58) having a third central axis (62), a second axis of rotation (64) and inner and outer surfaces (66,68) and being positioned about the first member (30), said second axis of rotation (64) being substantially the same as the first member axis (36), said third central axis (62) being spaced a second preselected distance (70) from said second axis of rotation (64), a third bearing element (72) being positioned between said first member (30) and said fourth annular member (58), a fifth annular member (60) having a fourth central axis (74) and an inner surface (76) and being positioned about said fourth annular member (58) and a fourth bearing element (78) positioned between said fourth and fifth annular members (58,60) and including:

said third bearing element (72) being in continuous contact about the entire periphery of the outer surface (38) of the first member (30) and of the inner surface (66) of the fourth annular member (58), said third bearing element (72) supporting said fourth annular member (58) in rotatable relationship relative to said first member (30); and said fourth bearing element (78) being in continuous contact about the entire periphery of the outer surface (68) of the fourth annular member (58) and of the inner surface (76) of the fifth annular member (60), said fourth bearing element (78) supporting said fifth annular member (60) in rotatable relationship relative to said fourth annular member (58).

4. The improvement, as set forth in claim 3, wherein the fourth central axis (74) is substantially the same as the third central axis (62) of the fourth annular member (58).

5. The improvement, as set forth in claim 3, wherein said first preselected distance (47) is substantially the same as said second preselected distance (70).

6. The improvement, as set forth in claim 3, wherein said first central axis (40) of the second annular member (34) and said first member axis (36) define a plane (71) and said third central axis (62) of the fourth annular member (58) is positioned substantially opposite said first member axis (36) relative to the first central axis (40) of the second annular member (32).

7. A rotating assembly (22) for an orbiting radial drive (10), comprising:

a frame (15);

a first member (30) connected to the frame (15);

a second annular member (32) having a first central axis (40), a first axis of rotation (42) and inner and outer surfaces (44,46) and being positioned about said first member (30), said first axis of rotation (42) being substantially the same as the first member axis (36), said first central axis (40) being spaced a first preselected distance (47) from said first axis of rotation (42);

a third annular member (34) having a second central axis (50) and an inner surface (52) and being positioned about said second annular member (32);

a first bearing element (48) being in continuous contact with and about the entire periphery of the outer surface (38) of the first member (30) and the inner surface (44) of the second annular member (32), said first bearing element (48) supporting said second annular member (32) in rotatable relationship relative to said first member (30); and a second bearing element (56) being in continuous contact with and about the entire periphery of the outer surface (46) of the second annular member (32) and the inner surface (52) of the third annular member (34), said second bearing element (56) supporting said third annular member (34) in rotatable relationship relative to said second annular member (32).

* * * * *